(12) United States Patent
Reddy et al.

(10) Patent No.: US 8,898,468 B2
(45) Date of Patent: Nov. 25, 2014

(54) METHOD FOR ENSURING SECURITY AND PRIVACY IN A WIRELESS COGNITIVE NETWORK

(75) Inventors: Ranga Reddy, Asbury Park, NJ (US);
Thomas Kiernan, Little Silver, NJ (US);
Apurva N. Mody, Lowell, MA (US)

(73) Assignee: BAE Systems Information and Electronic Systems Integration Inc., Nashua, NH (US)

(\*) Notice: Subject to any disclaimer, the term of this patent is extended or adjusted under 35 U.S.C. 154(b) by 443 days.

(21) Appl. No.: 12/959,732

(22) Filed: Dec. 3, 2010

(65) Prior Publication Data

US 2011/0138183 A1  Jun. 9, 2011

Related U.S. Application Data

(60) Provisional application No. 61/267,737, filed on Dec. 8, 2009, provisional application No. 61/312,267, filed on Mar. 10, 2010.

(51) Int. Cl.
| | | |
|---|---|---|
| H04L 9/32 | (2006.01) | |
| H04L 9/08 | (2006.01) | |
| H04K 3/00 | (2006.01) | |
| H04W 12/06 | (2009.01) | |
| H04L 9/30 | (2006.01) | |
| H04W 12/02 | (2009.01) | |
| H04L 29/06 | (2006.01) | |

(52) U.S. Cl.
CPC ............ *H04W 12/06* (2013.01); *H04L 9/0891* (2013.01); *H04L 9/3247* (2013.01); *H04K 2203/18* (2013.01); *H04K 3/25* (2013.01); *H04K 3/65* (2013.01); *H04L 2463/062* (2013.01); *H04L 2209/80* (2013.01); *H04L 9/3066* (2013.01); *H04L 9/0822* (2013.01); *H04L 63/0823* (2013.01); *H04L 9/3263* (2013.01); *H04W 12/02* (2013.01)
USPC .......................................... 713/169; 380/270

(58) Field of Classification Search
CPC ....... H04W 8/16; H04W 12/08; H04W 12/06; H04W 12/12; H04K 3/25; H04K 3/65; H04K 2203/18; H04L 9/32; H04L 63/08; H04L 63/12
USPC .................. 713/168, 169, 171, 175; 380/270
See application file for complete search history.

(56) References Cited

U.S. PATENT DOCUMENTS

| | | | | |
|---|---|---|---|---|
| 2007/0037569 | A1* | 2/2007 | McNiff et al. ............. | 455/422.1 |
| 2009/0041240 | A1* | 2/2009 | Parkvall et al. ............... | 380/247 |
| 2009/0253409 | A1* | 10/2009 | Slavov et al. ................. | 455/411 |
| 2010/0238868 | A1* | 9/2010 | Melpignano et al. ......... | 370/329 |
| 2012/0172002 | A1* | 7/2012 | Hahn et al. .................... | 455/411 |

OTHER PUBLICATIONS

John Benko et al., IEEE P802.22 ;"Wireless RANs"; doc.: IEEE 802.22-06/0003r2; dated Feb. 2006.*
G.A. Safdar et al., ; "Common Control Channel Security Framework for Cognitive Radio Networks" Vehicular Technology Conference, 2009. VTC Spring 2009. IEEE 69th; Date of Conference: 26-29.*
Mody et al., "IEEE P802.22; Wireless RANs"; Date: Jun. 19, 2008.*
\* cited by examiner

*Primary Examiner* — Harunur Rashid
(74) *Attorney, Agent, or Firm* — Maine Cernota & Rardin; Douglas P. Borum

(57) ABSTRACT

In some embodiments, authentication, confidentiality, and privacy are enhanced for a wireless network of cognitive radios by encryption of network management and control messages as well as data traffic, thereby protecting information pertaining to node identification, node location, node-sensed incumbent transmissions, CRN frequency channel selections, and such like. During initial network registration, a temporary ID can be issued to a node, and then replaced once encrypted communication has been established. This prevents association of initial, clear-text messages with later encrypted transmissions. Elliptic curve cryptography can be used for mutual authentication between subscribers and the base station. ECC-based implicit digital certificates can be embedded in co-existence beacons used by CRN nodes to coordinate use of frequency channels, thereby preventing denial of service attacks due to transmitting of falsified beacons. Similar certificates can be embedded within identity beacons used to protect certain incumbents from interference by the CRN.

13 Claims, 8 Drawing Sheets

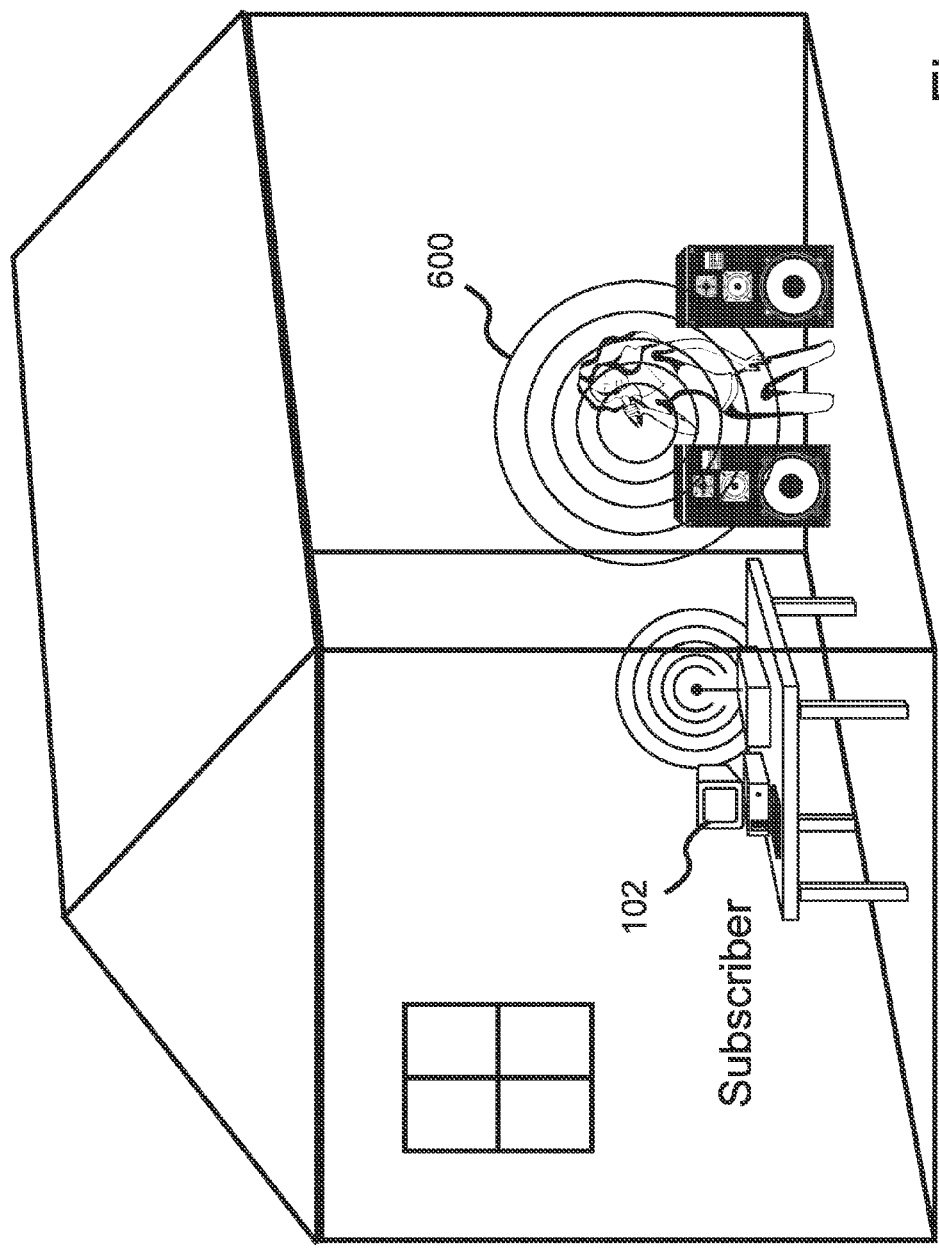

METHOD FOR ENSURING SECURITY AND PRIVACY IN A WIRELESS COGNITIVE NETWORK

RELATED APPLICATIONS

This application claims the benefit of U.S. Provisional Application No. 61/267,737, filed Dec. 8, 2009, incorporated herein by reference in its entirety for all purposes. This application also claims the benefit of U.S. Provisional Application No. 61/312,267, filed Mar. 10, 2010, incorporated herein by reference in its entirety for all purposes.

STATEMENT OF GOVERNMENT INTEREST

The present invention was made under US Army Cooperative Research and Development Agreement, Army Control Number 0401-A-C843 awarded by the United States Army, and the United States Government has certain rights in this invention.

FIELD OF THE INVENTION

The invention relates to wireless networks, and more particularly to methods for ensuring security and privacy in wireless networks that employ cognitive radio technology.

BACKGROUND OF THE INVENTION

Due to the heavy use of wireless communications in both civilian and military environments, there is often a shortage of available communication bandwidth. Traditionally, frequency "bands" have been assigned on a regional or global basis according to specific types of usage, such as commercial AM and FM radio, commercial VHF and UHF television, citizens band radio, licensed amateur radio, cellular telephony, satellite communication, ship-to-shore communication, aviation communication, military communication, and such like. Within many of these bands, such as commercial television and radio bands, specific frequencies or "channels" are assigned to individual entities, such as channels assigned to specific radio and television stations. Typically, such assignments provide for exclusive use of the assigned channel over a designated geographic region.

This traditional approach of exclusively reserving specific communication channels for specific entities generally leads to inefficient use of bandwidth, since at any given time, and in any given location, it is unlikely that all of the assigned channels will be in use. For example, a commercial television station may not have any broadcast coverage in certain portions of its assigned geographic region, and/or may broadcast only at certain times, leaving the assigned channel empty and unused at other locations and/or at other times.

One approach to taking advantage of this unused bandwidth is to use "Cognitive Radio" or "CR" technology. A cognitive radio is a radio that is capable of sensing its local bandwidth environment, so as to determine at any given time what frequencies are unused (so-called "white spaces") or underused (so-called "grey spaces"). Cognitive radios can then opportunistically use these white and/or grey spaces to communicate with each other without requiring a fixed, dedicated frequency assignment. It is fundamental to this approach that the cognitive radios function as secondary users of whatever channels they select. Therefore, they must effectively monitor the channels at all times for primary, or "incumbent" usage, and avoid any interference with the incumbents.

In particular, with reference to FIG. 1, cognitive radios can be used to form a so-called "Wireless Regional Area Network," or WRAN. In a WRAN, a base station CR 100 communicates with a plurality of subscriber CR's, or "subscribers" 102. In some implementations where the subscribers are not mobile, they are referred to as "Customer Premise Equipment" or "CPE" CR radios. The base station 100 determines which channels are available at any given time and communicates with the subscribers 102 to direct the usage thereof by the WRAN. In the simplest case, the base station 100 monitors and analyzes the bandwidth environment, selects an available channel, and broadcasts information on that channel to the subscriber radios 102. The base station 100 may also consult a database of known incumbents 104 and their assigned channels, regions, and patterns of usage. When a subscriber radio 102 wishes to join the WRAN, it surveys the local bandwidth environment until the base station 100 is located, and then identifies itself to the base station 100 and joins the network. Once the WRAN is established, the base station 100 coordinates switching of the WRAN to other frequencies from time to time, if and as needed. In FIG. 1, the incumbent 104 is illustrated as not presently broadcasting, thereby leaving its assigned channel free for use by the WRAN. Usage of the available WRAN frequencies is coordinated in some implementations by an exchange of messages 106 between the nodes 100, 102, the messages 106 being referred to herein as "coexistence beacons." The co-existence beacons can include, for example, requests to use a channel and acknowledgements thereof, as are used for example in an RTS/CTS protocol.

With reference to FIG. 2, the network architecture of a WRAN is a so-called "star" configuration, whereby communication within the network is always between the base station 100 and a subscriber 102.

While methods are known for ensuring the privacy and security of conventional wireless networks, CR based networks are potentially exposed to many more vulnerabilities because of all the additional functionality that they include as compared, for example, to networks based on traditional software defined radios (SDR's). This is because each additional functionality is a potential soft spot for an attacker to gain access to the system, or against which to stage a denial of service (DoS) attack. As a result, besides providing typical traditional forms of security, a WRAN must provide enhanced security mechanisms for these cognitive functions, so as to provide protection not only to nodes of the WRAN, which are secondary users of the spectrum, but also to the primary or "incumbent" users.

For example, in cognitive radio systems, confidentiality and privacy mechanisms must protect not only the data, but also subscriber information, spectrum occupancy information (which may be of interest, e.g. to competitors), and the spectrum management information used by the base station 100 to configure the subscribers 102 and to direct the operation of the WRAN. In particular, when WRAN communication is used in military operations, it may be highly important to the safety of friendly combatants that management messages wherein nodes report their identities and their positions are securely protected.

In addition, the nodes of a WRAN must share whatever frequency channels are available. This can be facilitated by transmitting of co-existence beacons between the nodes, for example beacons transmitted by a node that informs other nodes of an intent to transmit over a specified channel. However, this approach can provide opportunities for a malicious entity to attack the WRAN by transmitting false beacons that confuse the legitimate nodes and deny them access to the WRAN frequency channel(s).

Also, the use of co-existence beacons 106 can provide an opportunity for malicious entities to attack the WRAN by transmitting false beacons that would tend to confuse legitimate nodes and deny them access to the WRAN frequency channels.

What is needed, therefore, is a method for ensuring reliability, security and privacy of communications in a wireless cognitive radio network.

SUMMARY OF THE INVENTION

A method is claimed for ensuring authentication, authorization, identification, data integrity, confidentiality, and privacy for a wireless network of cognitive radios ("CRN"), herein also referred to as a "wireless regional area network" or "WRAN."

The invention includes encryption of network management and control messages as well as data traffic, so as to protect subscriber identification information, spectrum-sensing information, subscriber location/geo-location information, and such like.

At least during initial registration with the network it is sometimes unavoidable that a limited amount of data must be sent "in the clear." For this reason, the present invention assigns a temporary node ID to each new subscriber, and subsequently replaces it with a securely transmitted permanent node ID once encrypted communication has been established.

So as to better protect the base station and the subscribers from spoofing and other attacks, strong Elliptic Curve Cryptography (ECC) is used for mutual authentication of each subscriber to the base station, and of the base station to each subscriber.

Also, ECC-based implicit digital certificates embedded in identity beacons are used to protect the co-existence of certain incumbents with the WRAN.

In addition, embodiments of the present invention include ECC-based digital certificates and/or signatures embedded in co-existence beacons, so that the beacons can be used to coordinate and facilitate sharing of available WRAN channels without providing an opportunity for malicious entities to attack the WRAN by transmitting false and confusing beacons that would tend to prevent legitimate nodes from accessing the WRAN frequency channels.

When a subscriber node first attempts to register with a base station in the network, the subscriber node and the base station mutually identify each other using both RSA/ECC based public/private key identification and verification of digital certificates. Once authentication has been established, the base station authorizes entry of the subscriber into the network. In addition to authentication, in various embodiments authorization of the subscriber node also requires that the subscriber support the method of the present invention, that the subscriber is not a source of spurious signals which could disrupt the WRAN, and/or that the subscriber is not located within a protected region that is known to be assigned to a valid incumbent transmitting on the frequency channel also being used by the WRAN. In other embodiments, the invention also enables entry into the network of subscribers that do not fully support the method of the present invention.

Once the subscriber is authorized, the base station transmits an encrypted permanent node ID to the subscriber, which replaces the temporary ID. This prevents a third party from associating any initial "clear" traffic intercepted during the registration process with later traffic transmitted to or received by the node. The base station also transmits an encrypted authorization key or "AK" to the subscriber. The AK is used to generate both a "key-encryption key" and a "traffic encryption key" or "TEK." Thereafter, a "dual key" strategy is employed, whereby both network management and control information and data traffic are encrypted using the TEK, which has a finite lifetime, while the KEK is used to periodically exchange new TEK's between the base station and the subscriber. In various embodiments, periodic re-authentication and/or re-authorization of the subscriber is also required, whereby the AK is cancelled if the re-authorization fails.

One general aspect of the present invention is a method for ensuring security and privacy of communications over a wireless network of cognitive radios ("CRN"). The method includes encrypting network management and control messages transmitted over the CRN. In some embodiments, elliptic curve cryptography (ECC) is applied in encrypting the network management and control messages. In various embodiments, the network management and control messages include at least one of: node identifying information; node location information; and information regarding signals detected by a node.

In other embodiments the network management and control messages transmitted over the CRN are encrypted using a "management-message-protection-key" ("MMP"), the MMP being used only for that purpose.

Another general aspect of the present invention is a method for ensuring security and privacy of communications over a wireless network of cognitive radios ("CRN"), the CRN including a managing base station in communication with at least one subscriber. The method includes using elliptic curve cryptography (ECC) to authenticate a subscriber to the base station. Some embodiments further include using ECC to authenticate the base station to at least one subscriber.

Another general aspect of the present invention is a method for ensuring security and privacy of communications over a wireless network of cognitive radios ("CRN"), the CRN including a managing base station in communication with at least one candidate node. The method includes receiving from the candidate node a request to join the CRN, transmitting to the candidate node a temporary node identifier, establishing encrypted communication with the candidate node, authorizing the candidate node to join the CRN, and conveying to the candidate node by encrypted transmission a permanent node identifier in replacement of the temporary node identifier.

In some embodiments, the base station is able to withdraw authorization from an authorized candidate node so as to remove the candidate node from the CRN. In some of these embodiments the method includes withdrawing of authorization by the managing base station from the candidate node due to transmitting of spurious noise by the candidate node and/or determining by the base station that the subscriber is within a protected zone surrounding a known incumbent.

In various of these embodiments, establishing encrypted communication with the candidate node and authorizing the candidate node to join the CRN includes: receiving a registration request from the candidate node, the registration request including a subscriber digital certificate and a subscriber public key; determining an authenticity of the subscriber digital certificate; if the subscriber digital certificate is authentic, applying authorization criteria to the candidate node; if the authorization criteria are met, authorizing participation of the candidate node in the CRN; using the subscriber public key, encrypting an authorization key and transmitting the encrypted authorization key to the candidate node, the candidate node being able to derive therefrom a key-encryption-key ("KEK"), and a "management-message-protection-key ("MMP"), an MMP expiration criterion being associated with the MMP so as to cause the MMP to expire when the MMP expiration criterion is met; generating a transmission-encryption-key ("TEK"), encrypting the TEK using the KEK, and transmitting the encrypted TEK to the candidate node, a TEK expiration criterion being associated with the TEK so as to cause the TEK to expire when the TEK expiration criterion is met; using the TEK, encrypting all data communication with the candidate node over the CRN; using the MMP, encrypting all management and control communication with the candidate node over the CRN; using the KEK, encrypting a replacement TEK and transmitting the encrypted replacement TEK to the candidate node before the TEK expiration criterion is met; using the KEK, encrypting a replacement MMP and transmitting the encrypted replacement MMP to the candidate node before the MMP expiration criterion is met; and so long as the candidate node continues to participate in the CRN, repeating the encrypting of a replacement TEK and of a replacement MMP, and the transmitting the encrypted replacement TEK and the encrypted replacement MMP to the candidate node before the TEK and MMP expiration criteria are met.

In some of these embodiments receiving a registration request includes receiving information specifying ID information, location information, configuration information, and capability information of the candidate node. In other of these embodiments elliptic curve cryptography (ECC) is applied in encrypting an authorization key, the TEK, all data communication with the candidate node over the CRN, all management and control communication with the candidate node over the CRN, a replacement TEK, and/or a replacement MMP.

In still other of these embodiments receiving a registration request includes receiving information specifying a location of the candidate node. In some of these embodiments the authorization criteria include a requirement that the candidate node is not located within a protected region assigned to a valid incumbent using a frequency that is in use by the CRN.

In yet other of these embodiments the application of authorization criteria includes collaborative sensing by nodes in the CRN of spurious signals, and the authorization criteria include a requirement that the candidate node is not a source of spurious signals that might interfere with the CRN.

And in yet other of these embodiments receiving a registration request includes receiving information specifying compliance of the candidate node with at least one of specified security protocols and specified regulatory protocols. In some of these embodiments the authorized criteria include a requirement that the candidate node comply with at least one of the specified security protocols and the specified regulatory protocols.

In still other of these embodiments the expiration criterion is an elapsing of a time interval. And in yet other of these embodiments the expiration criterion is the encryption of a specified number of data packets using the TEK. Still other of these embodiments further include after a specified re-authorization criterion is met, requiring re-authorization of the candidate node, and only permitting continued participation by the candidate node in the CRN if the re-authorization is successful.

Another general aspect of the present invention is a method for sharing access to a frequency channel among nodes of at least one wireless network of cognitive radios ("CRN") while resisting malicious interference in, each CRN including a base station node in communication with at least one subscriber node, the method comprising transmitting of co-existence beacons between the nodes of the CRN's, the coexistence beacons including information that facilitates sharing of the frequency channel by the nodes, each of the co-existence beacons being protected by an ECC-based certificate and signature.

Various embodiments further include communicating by the base station node with at least one external database server, at least one digital certificate being used by the base station to verify an identity of the external database server.

BRIEF DESCRIPTION OF THE DRAWINGS

FIG. 6 illustrates detection and verification by a node of a WRAN of a wireless microphone beacon containing an embedded ECC-based implicit digital certificate.

DETAILED DESCRIPTION

Figure 1:
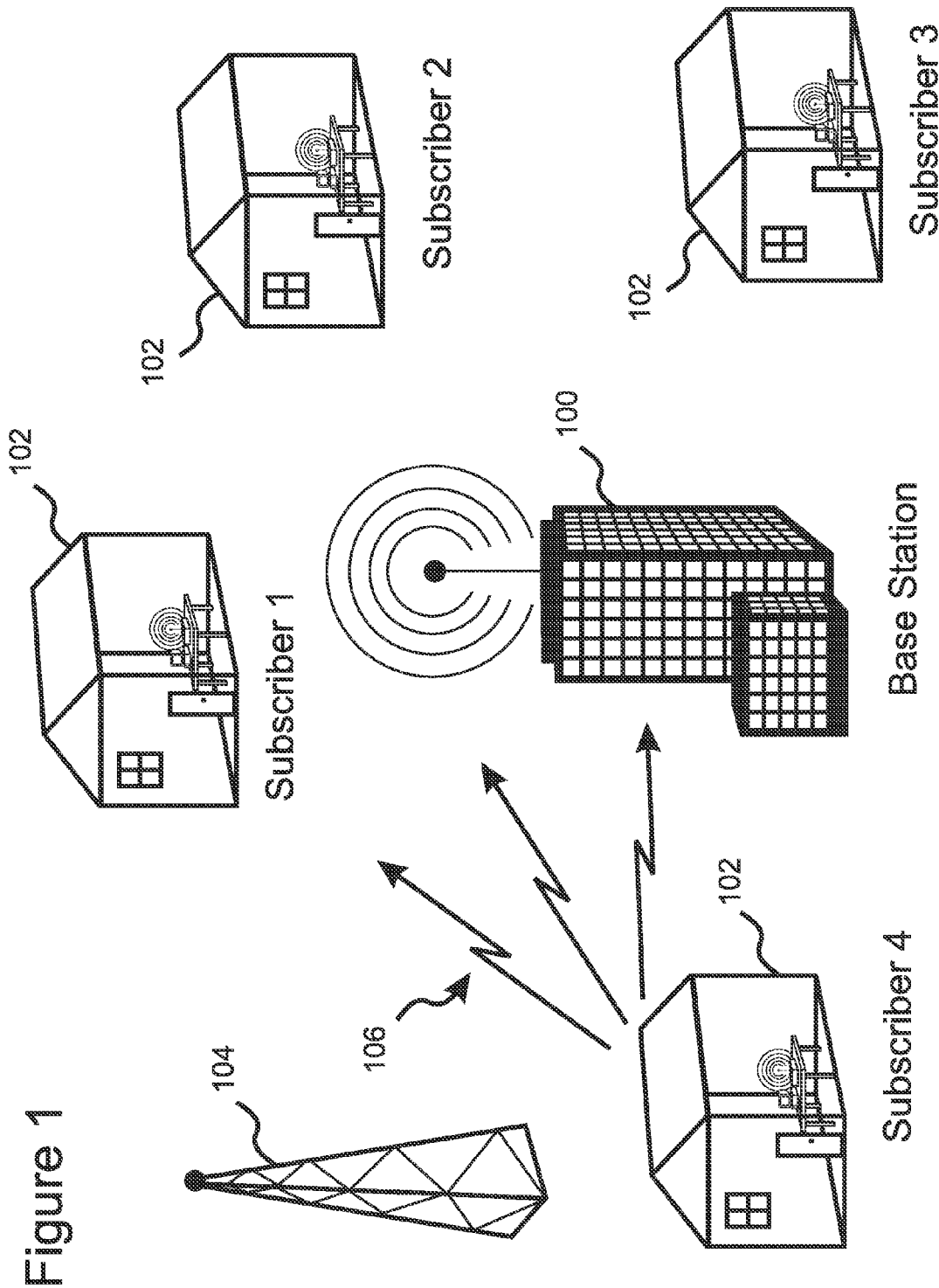
FIG. 1 illustrates a base station communicating with a plurality of subscribers on a frequency assigned to but not in use by an incumbent, while one of the nodes transmits a co-existence beacon to the other nodes.
Figure 2:
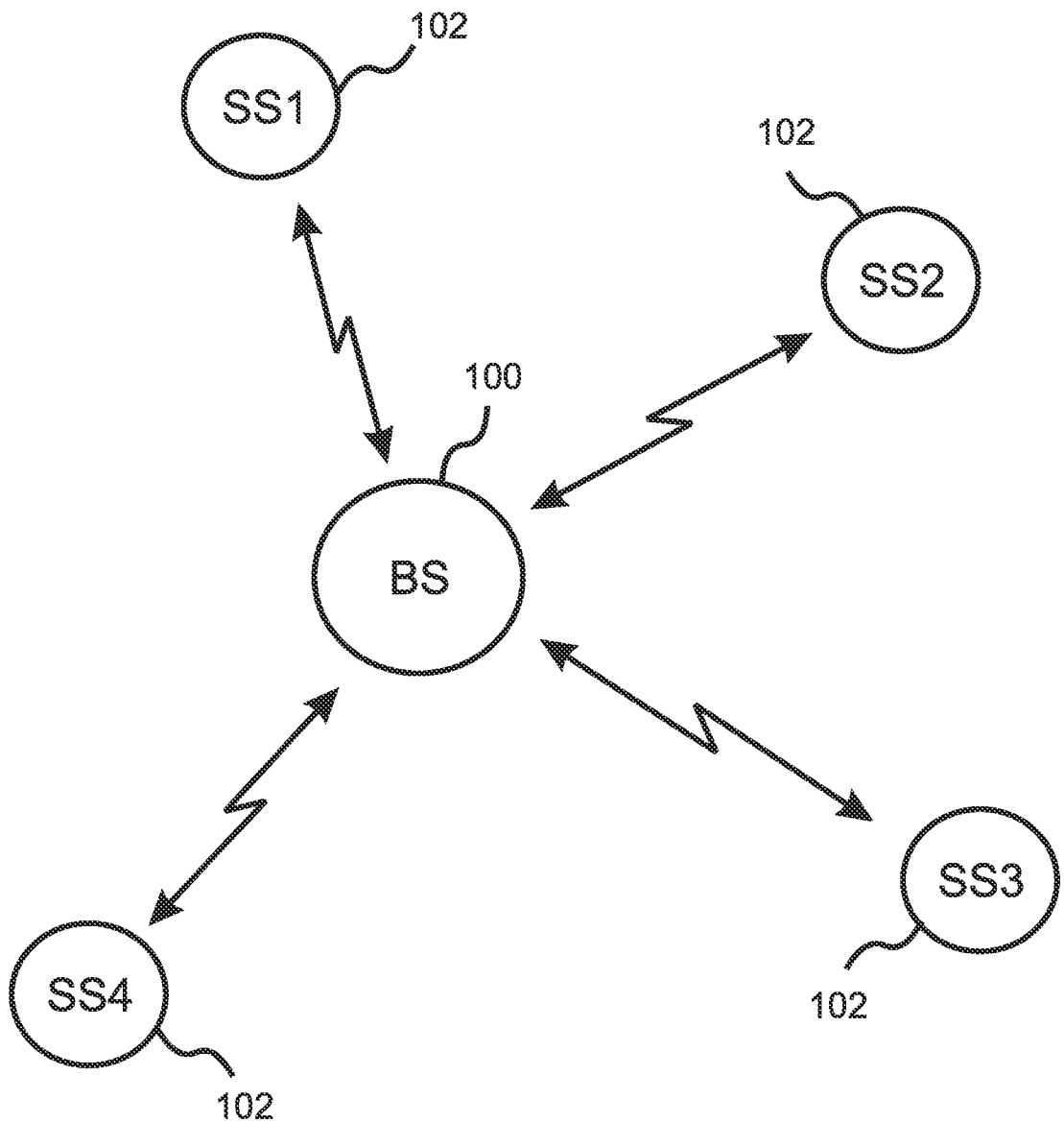
FIG. 2 illustrates the star topology of a wireless regional area network.

The present invention is a method for ensuring authentication, authorization, identification, data integrity, confidentiality, and privacy for a wireless network of cognitive radios, herein also referred to as a "CRN," a "wireless regional area network," or a "WRAN." In addition to the requirements applicable to any wireless network, a cognitive radio network must also distinguish between valid incumbents, which have primary rights to a frequency channel, and the nodes comprising the WRAN, which have only a secondary right to opportunistically use the frequency channel. In addition, a CRN is required to protect not only the data being transmitted, but also network management and control messages, including messages containing information pertaining to the identities and/or the locations of the subscribers, as well as the spectrum occupancy information (which may be of interest, e.g. to competitors) and the spectrum management information used by the base station 100 to configure and control the subscribers 102, to identify and validate incumbents, and to avoid conflicts with incumbents.

If co-existence beacons are used to coordinate usage of the WRAN frequency channels, the CRN must also protect the network against malicious transmission of false beacons that would tend to confuse the legitimate nodes and deny them access to the WRAN frequency channels. Embodiments of the present invention include authentication of co-existence beacons based on ECC-based implicit certificates so as to allow subscribers 102 and base stations 100s to verify the authenticity of the beacons.

In some embodiments, ECC-based implicit certificates are used to calculate a signature over the co-existence beacon. The signature is then added to the beacon as an information element (IE). The receiving station (subscriber 102 or BS 100) uses the certificate information to verify the signature.

Authentication:

This functionality provides assurance that the communicating parties, sender and receiver, are who they purport to be. In cognitive networks there is the added problem of distinguishing between the valid incumbents of the spectrum and the secondary users. The present invention provides features that:

Validate incumbent signals and beacons such as wireless microphone beacons;

Detect and counter "man-in-the-middle" and similar types of attack that attempt to steal available spectrum space;

Detect and counter spoofing and similar types of attack;

Authenticate geo-location information;

Authenticate co-existence information between nodes of a WRAN and between neighboring WRAN networks; and Detect and report spurious transmissions from other subscribers.

Authorization

Authorization is the ability of the system to control access to the spectrum/network. Different network entities will have different privilege levels. For example, a BS 100 may be authorized to forcibly remove an interfering subscriber 102 from the network. In cognitive radio networks, the ability of the BS 100 spectrum manager to sense the available spectrum, make decisions regarding its use, and enforce those decisions at the subscriber level is an important authorization feature. In various embodiments, the BS 100 can de-authorize a subscriber 102 from its network at any time. The decision on de-authorizing is made through various policy sets.

The present invention provides features which ensure that:

Only authorized parties shall be allowed to configure the spectrum manager at the BS 100 and the spectrum automaton at the subscriber 102;

Configuration information shall be encrypted and authenticated; and

The BS 100 shall be authorized to remove a subscriber 102 from the network if it interferes with the incumbents Identification Identification works hand-in-hand with authentication to ensure that the incumbents and WRAN nodes can be positively identified. To that end, the present invention provides mechanisms that will:

Identify transmitting/receiving BS 100 and subscriber 102 equipment; and Ensure that the identification methods employed cannot be compromised through spoofing type attacks.

Integrity

Integrity is the assurance that the information transmitted over the medium arrives at its destination unaltered. Integrity provides write protection for the content. The present invention provides features that:

Protect against false beacon signals; and

Protect against replay attacks that use previously transmitted valid data.

In some embodiments, protection against replay-type attacks is provided by tagging each of the packets with a random packet number ("PN") as its header. This ensures that a repeated packet can be detected and appropriate action can be taken.

Confidentiality/Privacy

In embodiments of the present invention confidentiality features work closely with integrity features to ensure read as well as write protection for all transmitted network management and control information as well as data traffic through the application of encryption and ciphers. A wireless network is more sensitive to transmission errors than a wired network due to propagation effects such as shadowing, fading, and un-intentional interference. This sensitivity can wreak havoc with complex ciphers and cause numerous re-transmissions resulting in wasted bandwidth. For cognitive radio networks this sensitivity is especially troublesome because of the opportunistic nature of spectrum use by the WRAN nodes and the fact that use of the spectrum is not guaranteed. Accordingly, the present invention provides:

Support for robust ciphers and encryption methods applied to all data traffic; and Encryption mechanisms to safeguard WRAN spectrum availability and all other network management and control information from eavesdropping by competitors or would-be attackers.

Figure 3:
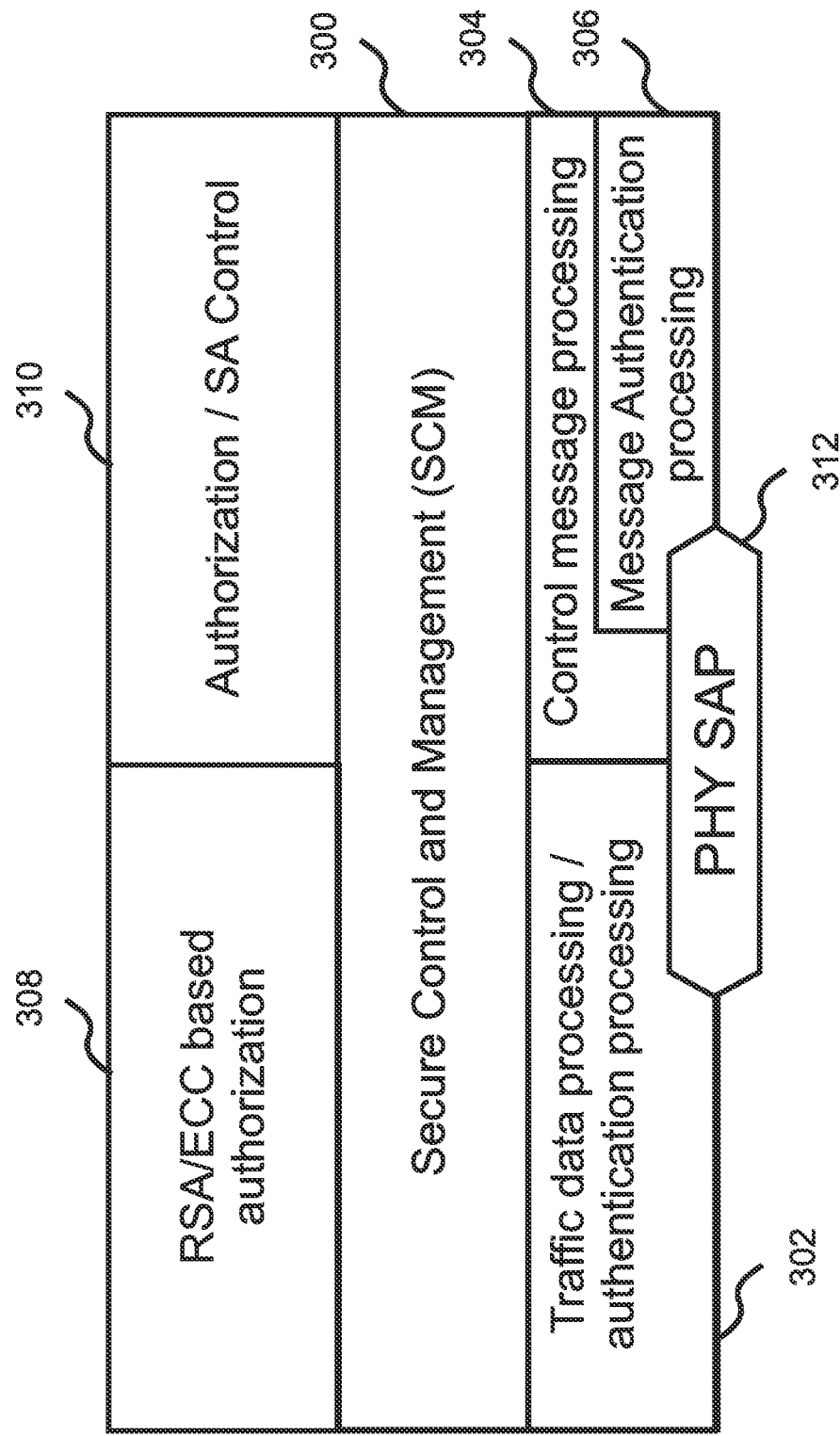
FIG. 3 illustrates a computing architecture that is able to implement an embodiment of the present invention.

FIG. 3 illustrates a computing architecture that is able to implement an embodiment of the present invention. A Secure Control and Management module or "SCM" 300 provides overall control of all security actions of the invention, including generation and verification of encryption keys. A traffic data processing and authentication processing module 302 performs all required encryption and decryption of data traffic, and performs all authentication of the data traffic. A control message processing module 304 processes various network control messages, and provides authentication and encryption thereof as needed 306. An RSA-based and/or ECC-based Authorization module authorizes subscribers 102 by verifying digital certificates 308, and an authorization/SA control module 310 controls the authorization and traffic encryption processes, including control of the "spectrum automation" or "SA" functionality that operates on the subscriber nodes 102 under control of the base station 100 and executes tasks such as network registration, spectrum-sensing, reporting of sensed data to the base station 100, and such like.

In various embodiments, the SCM provides for both mutual authentication (BS 100 authenticates subscribers 102 and subscribers 102 authenticate the BS 100) and unilateral authentication (BS 100 authenticates subscribers 102, but not vice versa). It also supports periodic re-authentication/reauthorization and key refreshing. The key management protocol uses digital certificates together with RSA public-key encryption algorithm and/or a sequence starting with RSA authentication or even with ECC public-key encryption algorithm. It uses strong encryption algorithms to perform key exchanges between a subscriber 102 and a base station 100.

In some embodiments, the SCM also provides encryption/decryption of co-existence beacons 106 and embedding/validation of ECC-based digital certificates and/or signatures embedded in the beacons. The various modules of FIG. 3 communicate with the network through a physical service access point, or "PHY SAP" 312.

Figure 4A:
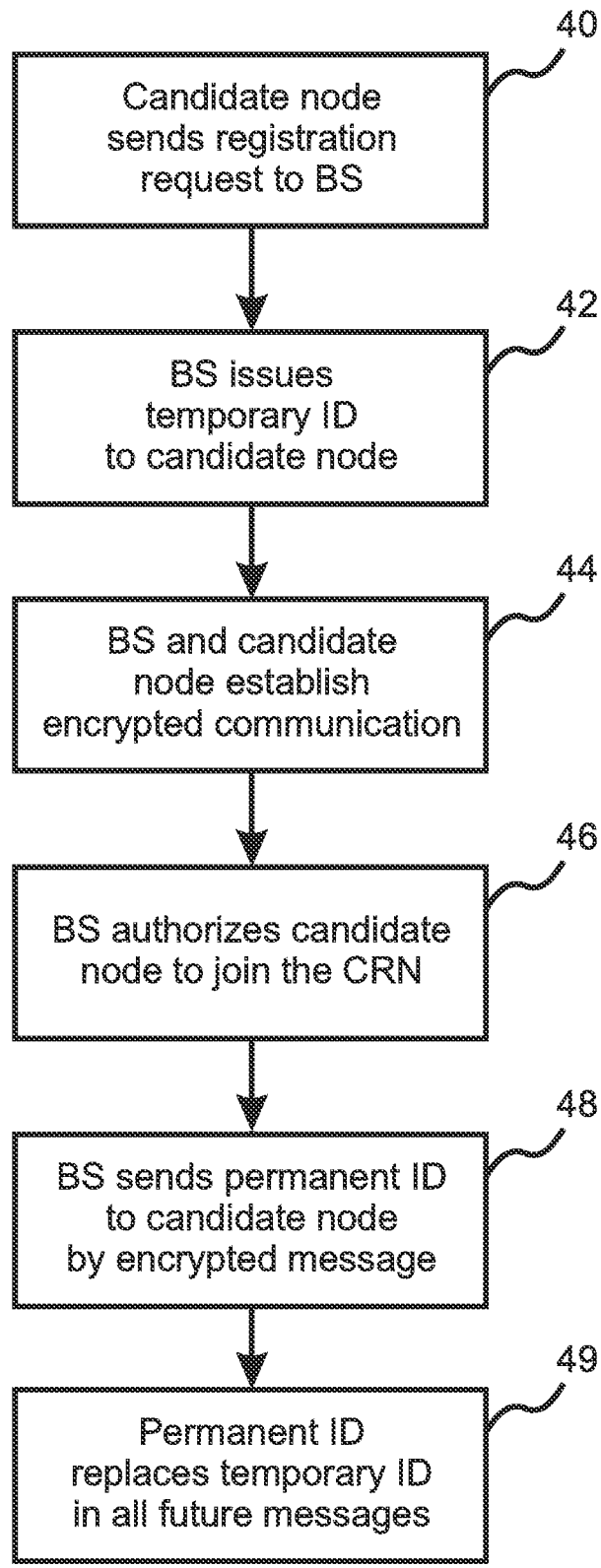
FIG. 4A is a flow diagram illustrating the issuing of temporary and permanent node ID numbers to a candidate node by a base station in an embodiment of the present invention.

FIG. 4A illustrates issuing of temporary and permanent node ID's during registration of a node with a CRN in some embodiments of the present invention. The process begins with sending to the base station of a request 40 by a candidate node to join the CRN. In various embodiments, it can be unavoidable that at least some portion of this communication is sent without encryption. The base station replies by issuing a temporary ID to the candidate node 42, after which the BS and the candidate node establish encrypted communication with one another 44. A specific embodiment of this step is discussed in more detail below with reference to FIG. 4B.

Having established secure communications 44, the base station proceeds to apply authorization criteria to the candidate node. If the candidate node meets the criteria, then the base station authorizes it to join the CRN 46. At this point, a permanent ID is sent by the base station to the candidate node in a secure, encrypted message 48. The permanent ID replaces the temporary ID in all future messages 49, making it difficult for a malicious entity to associate any unencrypted messages intercepted during the beginning of the exchange 40, 42 with any messages intercepted once the permanent ID has been issued.

Figure 4B:
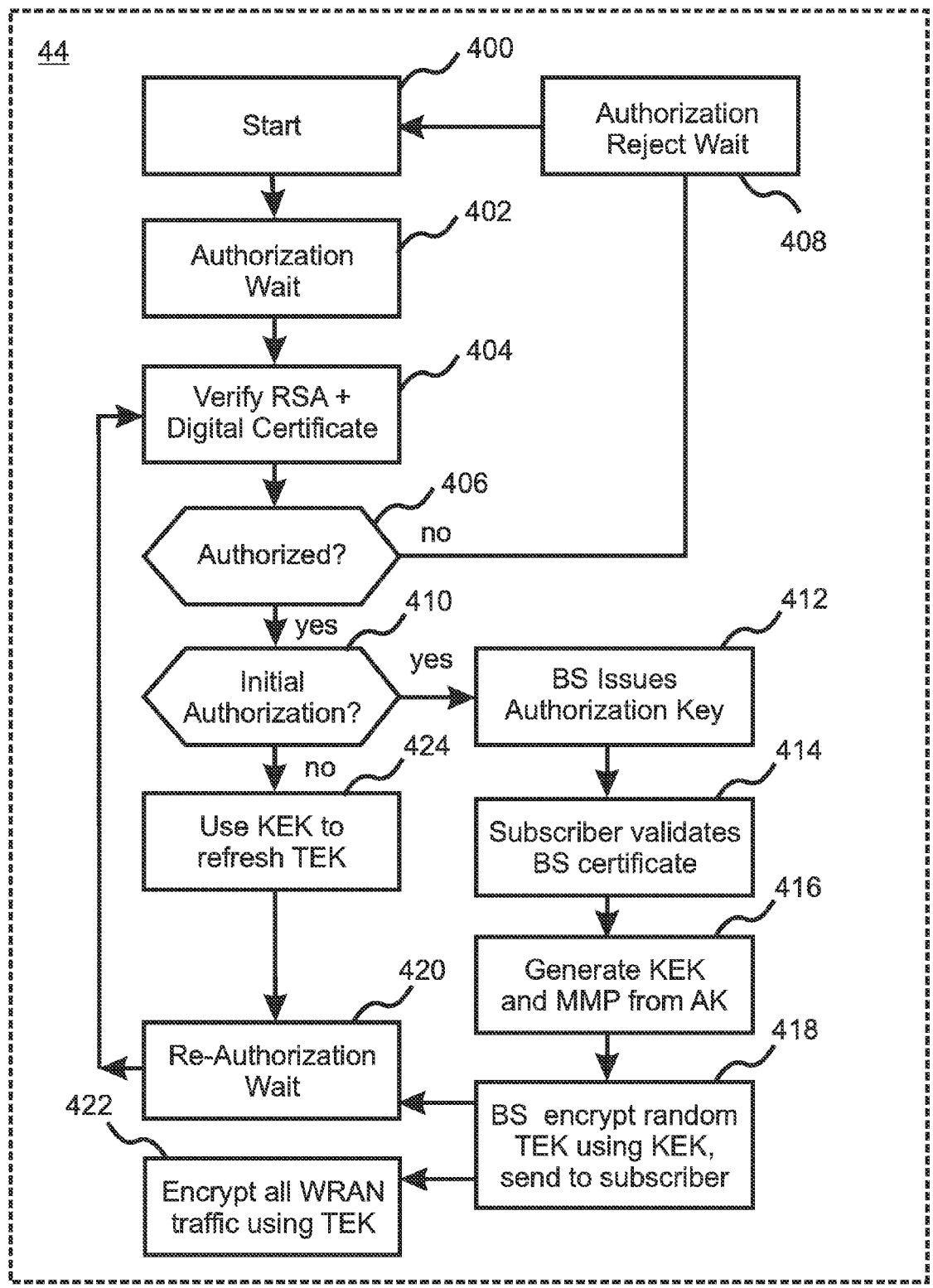
FIG. 4B is a flow diagram that illustrates a strategy for issuing and maintaining encryption keys in the embodiment of FIG. 4A.

FIG. 4B illustrates the establishment of encrypted messaging and the authorization of nodes in an embodiment of the present invention. When a candidate node 102 wishes to join the WRAN 400, it begins by scanning its local frequency environment so as to locate the channel on which the base station 100 is operating. The candidate node 102 then transmits to the base station 100 a request to join the WRAN, together with a digital certificate substantiating its identity and, in various embodiments, also including a list of security protocols that it supports and/or information regarding its physical location, which in various embodiments is either supplied to the candidate node 102 by a user or determined using a geo-location device such as a GPS.

After an authorization waiting period 402, the base station 100 uses public key/private key authentication, for example according to the RSA and/or ECC protocols, as well as digital certificate verification, so as to authenticate the identity of the candidate node 102.

In various embodiments, after authenticating the candidate node 102, the base station 100 compares the location information supplied by the candidate node 102 with a database of known incumbents and/or with spectrum-sensing and geo-location information gathered by other nodes in the WRAN so as to determine if the candidate node 102 is located in a protected area belonging to an incumbent and/or if the candidate node 102 is emitting spurious signals that might disrupt the WRAN.

For some embodiments, if the candidate node 102 does not support the method of the present invention, then the step of authorization and key exchange is skipped. The BS 100 in these embodiments simply considers the candidate node 102 authenticated and authorizes the candidate node 102 to access the network. In other embodiments, if the candidate node 102 does not support the method of the present invention, it is not permitted to join the WRAN. The network entry of the candidate node 102 is de-authorized by the base station 100, and neither key exchange nor data encryption is carried out.

If the authentication is successful 404, and if there is no other reason to refuse entry by the candidate node 102 into the WRAN, the candidate node 102 is authorized 406 by the base station 100. Otherwise, the candidate node 102 is required to wait for a period 408 before re-attempting to join the WRAN. If this is an initial authorization 410, i.e. the candidate node 102 is joining the WRAN, then the base station 100 issues an "authorization key" or AK 412 to the candidate node 102. Security of the AK is ensured by encryption using a public key that is included with the digital certificate supplied by the candidate node 102 to the base station 100. In certain embodiments, the base station 100 also supplies a digital certificate which the candidate node 102 uses to authenticate 414 the base station 100, thereby providing mutual authentication between the base station 100 and the candidate node 102.

The AK is used by both the base station 100 and the candidate node 102 to generate a pair of encryption keys, the "key encryption key" or "KEK," and the transmission encryption key, or "TEK." Thereafter, the TEK is used to encrypt all data and network management and control traffic between the base station 100 and the candidate node 102. For enhanced security, the TEK periodically expires, and must be replaced by a new TEK. The KEK is used exclusively for encryption of the replacement TEK's that are transmitted 420 to the candidate node 102 by the base station 100.

Figure 4C:
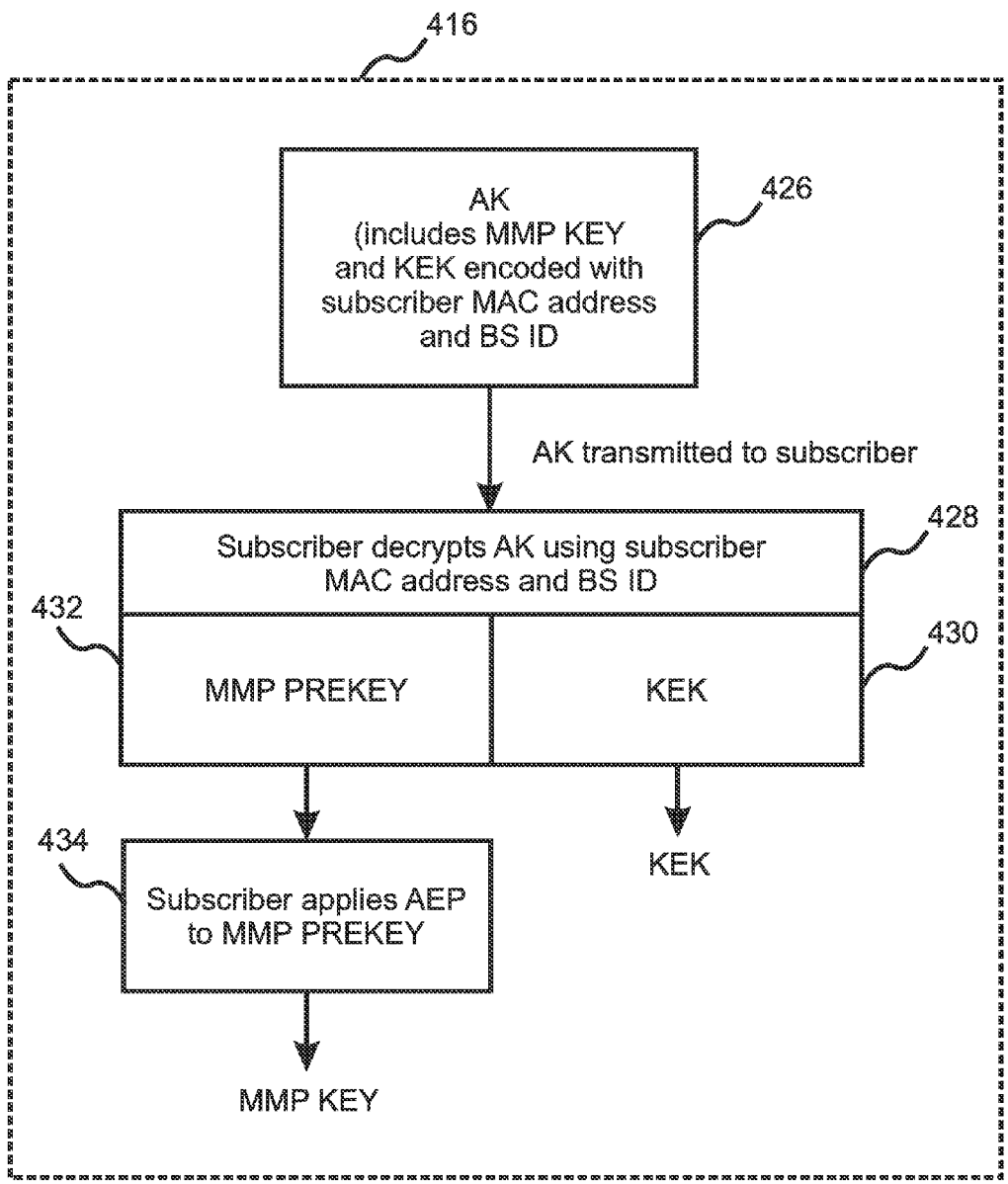
FIG. 4C is a flow diagram that illustrates a strategy for derivation of MMP and KEK keys from an authorization key in the embodiment of FIG. 4B.

Various embodiments require periodic re-authorization of each subscriber 102 by the base station 100. After a re-authorization waiting period 418, the authentication 404 and authorization 406 processes are repeated. In some of these embodiments, a new AK is supplied 412 and a new KEK/TEK pair is generated 416, while in other embodiments, such as the one illustrated in FIG. 4, a new AK is not generated when authorization of a subscriber 102 is renewed.

In various embodiments the base station 100 is capable of de-authorizing a subscriber 102 if it finds that the subscriber 102 is not using valid authorization keys, is generating spurious emissions, and/or is located in a region that is protected due to operation of a valid incumbent on the frequency channel also being used by the WRAN.

Figure 5:
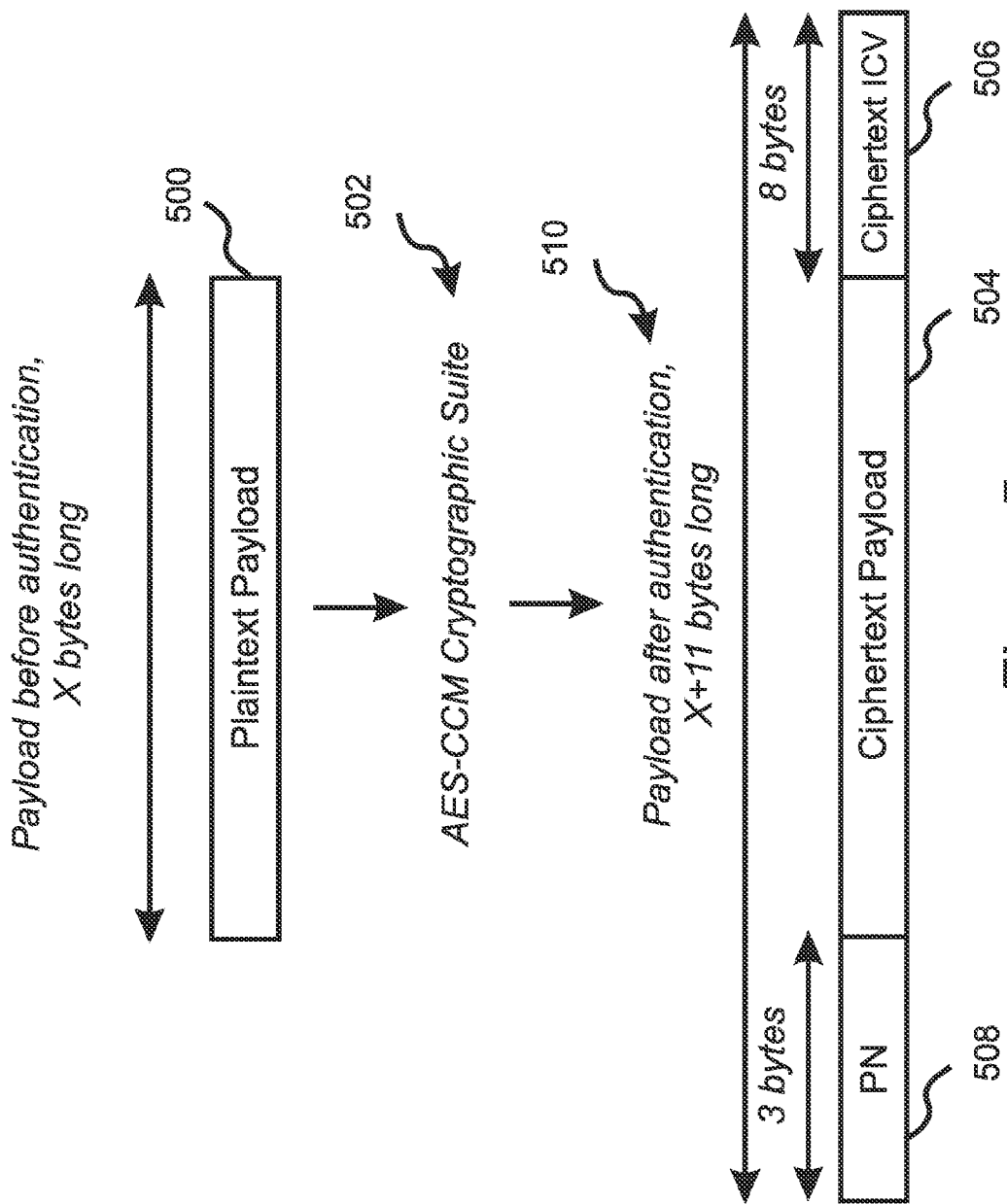
FIG. 5 illustrates encryption of a network management and control packet using AES-CCM in an embodiment of the present invention.

FIG. 5 shows how the authentication and encryption of a network management and control message is carried out in an embodiment of the present invention using AES-CCM mode encryption. A plaintext payload 500 containing, for example, node ID, node location, and/or node environment sensing information is encrypted using the AES-CCM encryption method and the currently valid TEK 502. The resulting encrypted payload 504 is then combined with an integrity check value 506 for message authentication, so as to prevent tampering with the payload. A packet number 508 is also added, so as to guard against lost or inserted packets. In some embodiments, the packet numbering is restarted every time a new TEK is issued. The packet number 508 is thereby used to track and enforce the TEK renewal requirement, since the TEK must be renewed before the maximum packet number is reached. In the embodiment of FIG. 5, the resulting payload 510 is eleven bytes longer than the original plaintext payload 500. For some embodiments, if only authentication is needed, then the plaintext payload 500 is transmitted instead of the encrypted payload 504 along with the ICV.

Authentication of Incumbent Identification Beacons

Embodiments of the present invention include authentication of beacons emitted by incumbent devices so as to protect the incumbents from harmful interference by a WRAN. In various embodiments the beacons include authentication information based on ECC-based implicit certificates so as to allow subscribers 102 and base stations 100s to verify the authenticity of the beacons.

In some embodiments, ECC-based implicit certificates are used to calculate a signature over the beacon. This signature is then added to the beacon as an information element (IE). The receiving station (subscriber 102 or BS 100) uses the certificate information to verify the signature.

This approach is illustrated in FIG. 6, which illustrates a beacon 600 emitted by a low-power wireless microphone being detected by a nearby subscriber 102. Although the microphone is detected by only one subscriber in the WRAN, verification of the digital certificate included in the beacon 600 enables the WRAN to confidently authenticate the microphone as a valid incumbent, and to take steps to avoid interference therewith.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for ensuring security and privacy of communications over a wireless network of cognitive radios ("CRN"), the CRN including a managing base station in communication with at least one candidate node, the method comprising:
   the managing base station receiving from the candidate node a request to join the CRN;
   the managing base station transmitting to the candidate node a temporary node identifier;
   the managing base station establishing encrypted communication with the candidate node using the temporary node identifier;
   the managing base station authorizing the candidate node to join the CRN;
   the managing base station conveying to the candidate node by encrypted transmission a permanent node identifier in replacement of the temporary node identifier; and
   the candidate node joining the CRN using the permanent node identifier,
   wherein establishing encrypted communication and authorizing the candidate node to join the CRN includes:
   receiving a registration request from the candidate node, the registration request including a subscriber digital certificate and a subscriber public key;
   determining an authenticity of the subscriber digital certificate;
   if the subscriber digital certificate is authentic, applying authorization criteria to the candidate node;
   if the authorization criteria are met, authorizing participation of the candidate node in the CRN;
   using the subscriber public key, encrypting an authorization key and transmitting the encrypted authorization key to the candidate node, the candidate node being able to derive therefrom a key-encryption-key ("KEK"), and a "management-message-protection-key ("MMP"), an MMP expiration criterion being associated with the MMP so as to cause the MMP to expire when the MMP expiration criterion is met;
   generating a transmission-encryption-key ("TEK"), encrypting the TEK using the KEK, and transmitting the encrypted TEK to the candidate node, a TEK expiration criterion being associated with the TEK so as to cause the TEK to expire when the TEK expiration criterion is met;
   using the TEK, encrypting all data communication with the candidate node over the CRN;
   using the MMP, encrypting all management and control communication with the candidate node over the CRN;
   using the KEK, encrypting a replacement TEK and transmitting the encrypted replacement TEK to the candidate node before the TEK expiration criterion is met;
   using the KEK, encrypting a replacement MMP and transmitting the encrypted replacement MMP to the candidate node before the MMP expiration criterion is met; and
   so long as the candidate node continues to participate in the CRN, repeating the encrypting of a replacement TEK and of a replacement MMP, and the transmitting the encrypted replacement TEK and the encrypted replacement MMP to the candidate node before the TEK and MMP expiration criteria are met.

2. The method of claim 1, wherein the base station is able to withdraw authorization from an authorized candidate node so as to remove the candidate node from the CRN.

3. The method of claim 2, wherein the method further comprises withdrawing of authorization by the managing base station from the candidate node due to at least one of:
   transmitting of spurious noise by the candidate node; and
   determining by the managing base station that the subscriber is within a protected zone surrounding a known incumbent.

4. The method of claim 2, wherein receiving from the candidate node a request to join the CRN includes receiving from the candidate node information specifying ID information, location information, configuration information, and capability information of the candidate node.

5. The method of claim 1, wherein elliptic curve cryptography (ECC) is applied in encrypting at least one of:
   an authorization key;
   the TEK;
   all data communication with the candidate node over the CRN;
   all management and control communication with the candidate node over the CRN;
   a replacement TEK; and
   a replacement MMP.

6. The method of claim 1, wherein receiving from the candidate node a request to join the CRN includes receiving from the candidate node information specifying a location of the candidate node.

7. The method of claim 1, wherein the authorization criteria include a requirement that the candidate node is not located within a protected region assigned to a valid incumbent using a frequency that is in use by the CRN.

8. The method of claim 1, wherein the application of authorization criteria includes collaborative sensing by nodes in the CRN of spurious signals, and the authorization criteria include a requirement that the candidate node is not a source of spurious signals that might interfere with the CRN.

9. The method of claim 1, wherein receiving from the candidate node a registration request includes receiving information from the candidate node specifying compliance of the candidate node with at least one of specified security protocols and specified regulatory protocols.

10. The method of claim 9, wherein the authorization criteria include a requirement that the candidate node comply with at least one of the specified security protocols and the specified regulatory protocols.

11. The method of claim 1, wherein the expiration criterion is an elapsing of a time interval.

12. The method of claim 1, wherein the expiration criterion is the encryption of a specified number of data packets using the TEK.

13. The method of claim 1, further comprising after a specified re-authorization criterion is met, requiring re-authorization of the candidate node, and only permitting continued participation by the candidate node in the CRN if the re-authorization is successful.

* * * * *